United States Patent
Jiang et al.

(10) Patent No.: US 8,433,793 B2
(45) Date of Patent: *Apr. 30, 2013

(54) DISPATCHING METHOD, DISPATCHING APPARATUS AND DISPATCHING SYSTEM

(75) Inventors: Haijun Jiang, Nanjing (CN); Ye Zhao, Paris (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 139 days.

This patent is subject to a terminal disclaimer.

(21) Appl. No.: 13/216,430

(22) Filed: Aug. 24, 2011

(65) Prior Publication Data

US 2011/0307944 A1    Dec. 15, 2011

Related U.S. Application Data

(63) Continuation of application No. 12/623,425, filed on Nov. 22, 2009, now Pat. No. 8,078,723.

(30) Foreign Application Priority Data

Nov. 25, 2008   (CN) .......................... 2008 1 0179109

(51) Int. Cl.
  *G06F 15/16*  (2006.01)
  *G06F 15/173*  (2006.01)
(52) U.S. Cl.
  USPC ........... 709/224; 709/203; 709/223; 709/238; 709/248
(58) Field of Classification Search .................. 709/203, 709/223, 224, 238, 248; 705/35, 37, 43; 715/763; 370/328
See application file for complete search history.

(56) References Cited

U.S. PATENT DOCUMENTS

| | | |
|---|---|---|
| 6,757,266 B1 | 6/2004 | Hundscheidt |
| 7,025,255 B1 | 4/2006 | Drummond et al. |
| 7,603,302 B1 | 10/2009 | Drummond et al. |
| 7,716,096 B2 | 5/2010 | Drummond et al. |
| 7,725,393 B2 | 5/2010 | Drummond et al. |

(Continued)

FOREIGN PATENT DOCUMENTS

| | | |
|---|---|---|
| CN | 101094239 A | 12/2007 |
| CN | 101202684 A | 6/2008 |

(Continued)

OTHER PUBLICATIONS

U.S. Appl. No. 12/623,425.

(Continued)

*Primary Examiner* — Quang N Nguyen
(74) *Attorney, Agent, or Firm* — Leydig, Voit & Mayer, Ltd.

(57) ABSTRACT

A dispatching method, a dispatching apparatus and a dispatching system are disclosed according to embodiments of the present invention. The dispatching method includes receiving a request initiated by a user terminal, where the request carries address information of the user terminal; obtaining the address information carried in the request and obtaining key information of an access server associated with the address information; searching for a corresponding node based on the key information of the access server and treating the node as a redirected serving node. A dispatching apparatus and a dispatching system are also disclosed according to embodiments of the present invention. The technical solution of the embodiments of the present invention may well solve the dispatching issue and has a more flexible application.

12 Claims, 3 Drawing Sheets

U.S. PATENT DOCUMENTS

| | | | |
|---|---|---|---|
| 7,822,673 B2 | 10/2010 | Inamochi | |
| 7,870,498 B2 | 1/2011 | Drummond et al. | |
| 7,934,006 B2 * | 4/2011 | Kato et al. | 709/227 |
| 8,269,999 B2 * | 9/2012 | Hasegawa | 358/1.14 |
| 2007/0288623 A1 * | 12/2007 | Kato et al. | 709/224 |
| 2008/0263134 A1 * | 10/2008 | Machida | 709/203 |

FOREIGN PATENT DOCUMENTS

| | | |
|---|---|---|
| CN | 101425969 B | 12/2010 |
| EP | 1322094 A1 | 6/2003 |
| WO | WO 01/14990 A1 | 3/2001 |

OTHER PUBLICATIONS

1$^{st}$ Office Action in corresponding European Application No. 09014425.4 (Jan. 11, 2012).

Extended European Search Report in corresponding European Application No. 09014425.4 (Feb. 8, 2010).

* cited by examiner

DISPATCHING METHOD, DISPATCHING APPARATUS AND DISPATCHING SYSTEM

CROSS-REFERENCE TO RELATED APPLICATION

This application is a continuation of U.S. patent application Ser. No. 12/623,425, filed on Nov. 22, 2009. The International Application claims priority to Chinese Patent Application No. 200810179109.0, filed on Nov. 25, 2008. The afore-mentioned patent applications are hereby incorporated by reference in their entireties.

FIELD OF THE INVENTION

The present invention relates to communication field, and more specifically, to a dispatching method, a dispatching apparatus, and a dispatching system.

BACKGROUND

With the continuous development of the network technology, there have been more and more demands on network planning and management. Content Delivery Network (CDN) technology, a new technology, is aimed at providing a new layer of network architecture in the existing internet and publishing the content in the network to a network edge which is closest to a user terminal. With this technology, the user terminal is able to acquire the desired content nearby. Thus, the issue of network congestion can be addressed and the access speed of the user terminal may be enhanced.

There are several conventional dispatching methods using CDN technology. For instance, a dispatching method based on IP address information of the user terminal and a method based on domain name resolution were proposed, where a commonly used one is the dispatching method based on IP address information of the user terminal.

With respect to the conventional method based on IP address information of the user terminal, a dispatching policy needs to be pre-configured in the CDN system. Generally, IP/Mask approach is adopted for the IP address information of the user terminal. In a CDN system, IP address or address segment of the user terminal is configured at a CDN node closest to the user terminal. Specifically, when the CDN system receives a request from the user terminal, the CND system searches, based on the IP address information of the user terminal, for the node close to the IP address and then dispatches the request to the node. For instance, in the CDN network covering Guangdong province, the dispatching policy can be pre-configured so that 218.19.0.0/16 is associated with CDN Guangzhou node and 219.133.0.0/16 is associated with CDN Shenzhen node. When the request from the user terminal whose IP address is 218.19.1.10 reaches the CDN system, the CDN system finds out that this IP address belongs to 218.19.0.0/16 which corresponds to CDN Guangzhou node. Thus, CDN Guangzhou node is assigned as a serving node to provide service for the user terminal.

During researching and practicing of conventional art, the inventor of the present invention discovers that the conventional art encounters below problems.

The conventional dispatching method based on IP address information of the user terminal is applicable to the CDN network where the IP address information of the user terminal is bonded with the area where the user terminal locates. However, in the networks of some operators, the IP addresses of the user terminals are all assigned dynamically, thereby making it impossible to distinguish the geographic locations of the user terminals using the IP address information. In this case, such dispatching method is no longer feasible. Therefore, the applicability of the conventional dispatching method needs to be improved.

SUMMARY

The present invention is directed to a dispatching method, a dispatching apparatus and a dispatching system so as to well address the dispatching issue and improve the applicability.

To solve the foregoing problem, technical solutions according to the present invention are implemented as follows.

A dispatching method is provided according to an embodiment of the present invention. The method includes:

receiving a request initiated by a user terminal, where the request carries address information of the user terminal;

obtaining the address information carried in the request, and obtaining key information of an access server associated with the address information; and searching for a corresponding node based on the key information of the access server, and treating the node as a redirected serving node.

A dispatching apparatus is provided according to an embodiment of the present invention. The apparatus includes:

a receiving unit, configured to receive a request initiated by a user terminal, where the request carries address information of the user terminal;

an obtaining unit, configured to obtain the address information carried in the request from the receiving unit, and obtain key information of an access server associated with the address information; and a dispatching handling unit, configured to search for a corresponding node based on the key information of the access server obtained by the obtaining unit, where the node serves as a redirected serving node.

A dispatching system is provided according to an embodiment of the present invention. The system includes:

an access server, configured to receive a request initiated by a user terminal and forward the request, where the request carries address information of the user terminal; and a dispatching apparatus, configured to receive the request forwarded by the access server, obtain the address information carried in the request and obtain key information of the access server associated with the address information, search for a corresponding node based on the key information of the access server, where the node serves as a redirected serving node.

As can be seen from the foregoing solutions, the embodiments of the present invention search for the bonding relationship between BRAS key information and a node by obtaining the BRAS key information associated with the address information of the user terminal. The BRAS key information may then be used to determine the home area of the user. As a result, the object of identifying geographical area can be achieved. A corresponding node is thus chosen for providing service to the user terminal. Consequently, the access speed is improved, the possibility of the occurrence of network congestion is decreased, and the adaptability is increased.

BRIEF DESCRIPTION OF THE DRAWINGS

A brief introduction of the annexed drawings used in the description of the embodiments or the conventional art will be made given to provide further understanding of the technical solutions in the embodiments of the present invention or in the conventional art. Apparently, the accompanying drawings in the description below only illustrate some embodiments of the present invention, and it is readily appreciated by those skilled in the art that other drawings can also be acquired based on the accompanying drawings without creative work.

FIG. 1 illustrates a flowchart of a method according to an embodiment of the present invention.

DETAILED DESCRIPTION

The technical solutions concerning the embodiments of the present invention will become more readily appreciated by reference to the following detailed description, when taken in conjunction with the accompanying drawings in the embodiments of the present invention. Apparently, the embodiments described herein are only a part of the embodiments of the present invention rather than exhaustive. It is readily appreciated by those skilled in the art that any other embodiments obtained without creative work based on the embodiments of the present invention shall be construed as falling within the scope of the present invention.

A dispatching method is provided according to an embodiment of the present invention. The dispatching method is able to well address the dispatching issue and is endowed with a flexible applicability.

Network devices involved in the embodiments of the present invention are introduced briefly below. The network devices include a user terminal, a policy server, a management system, a request routing server, a broadband remote access server, etc. It should be noted that Broadband Remote Access Server (BRAS) is given only as an example of an access server. Other type of access server may also be contemplated.

The Policy Server, coupled to the BRAS, is configured to manage traffic and address information, and to obtain address information of the user terminal from the BRAS. The Management System, for example, a network management system, is configured to obtain, from each policy serve, log-in information of the user terminal including address information of the user terminal, such as IP address information, and configure and maintain the bonding relationship between the address information of the user terminal and the BRAS key information. The Request Routing Server (RRS) is responsible for dispatching. That is, the RRS may redirect the request to a nearby CDN node according to a pre-configured dispatching policy based on the BRAS key information after the RRS obtains the bonding relationship between the address information and the BRAS key information. The BRAS is configured to manage the access of the user terminal and send address information of the user terminal to the policy server. It should be noted that the type of user terminal may vary with different solutions. For instance, the user terminal may be a computer, a set top box, a mobile station or a video telephony, etc.

Figure 1:
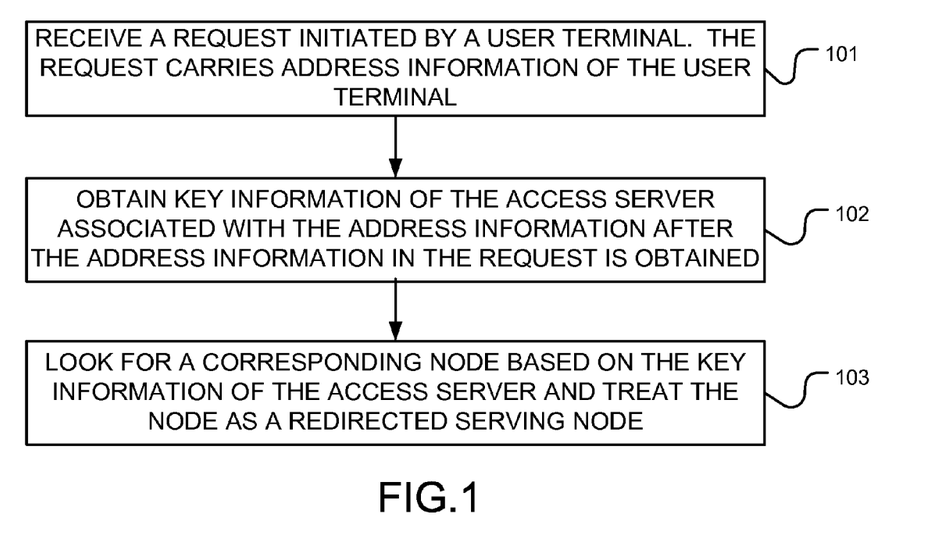

FIG. 1 is a flowchart of a method according to an embodiment of the present invention. The method includes the following steps.

Step 101: A request initiated by a user terminal is received. The request carries address information of the user terminal.

The request routing server receives a request which the user initiates via an access server. The request carries address information of the user terminal.

The address information of the user terminal herein may be the IP address information, and may also be other type of address information.

Step 102: Key information of the access server associated with the address information is obtained after the address information carried in the request is obtained.

After the request routing server obtains the address information carried in the request, the request routing server may request from the management system the key information of the access server associated with the address information and receive from the management system the key information of the access server associated with the address information.

After the request routing server obtains the address information carried in the request, the request routing server may also obtain the key information of the access server associated with the address information carried in the request, based on the recorded bonding relationship between the address information of the user terminal and the key information of the access server, where the bonding relationship is synchronized by the management system.

Step 103: A corresponding node is searched based on the key information of the access server and the node is treated as a redirected serving node.

The request routing server pre-configures the bonding relationship between the key information of the access server and the CDN node. Therefore, the key information of the access server can be used for locating the corresponding node as the redirected serving node. The serving node provides service with respect to the request initiated by the user terminal.

As can be seen from the embodiment, the present embodiment searches for the bonding relationship between the BRAS key information and the CDN node by obtaining the BRAS key information associated with the address information of the user terminal. The BRAS key information may then be used to determine the home area of the user. As a result, the object of identifying geographical area can be achieved. A nearby CDN node is thus chosen for providing service to the user terminal. Consequently, the access speed is improved, the possibility of the occurrence of network congestion is decreased, and the adaptability is increased.

Figure 2:
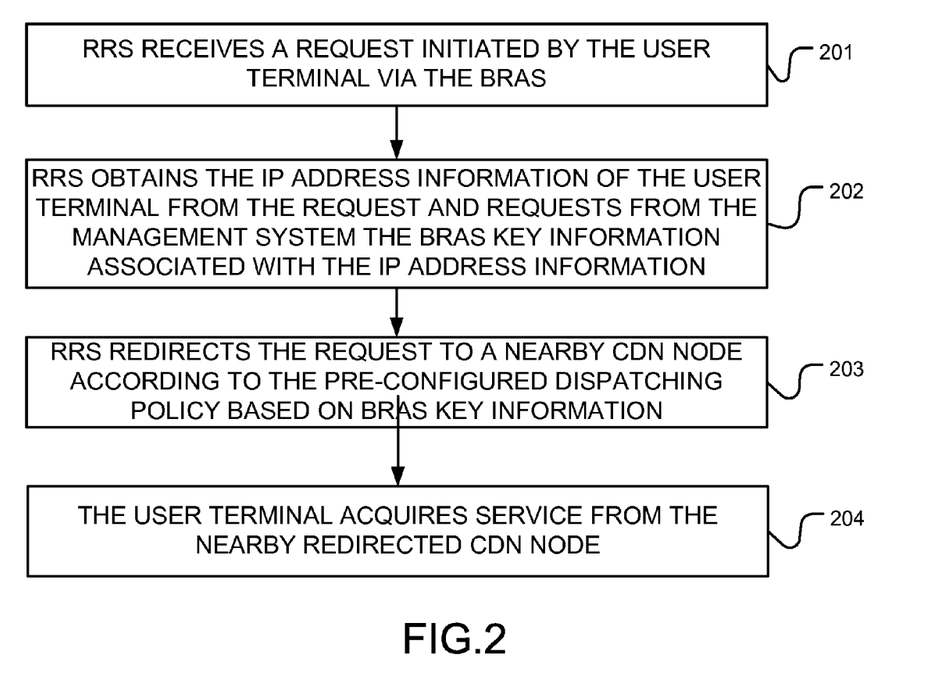
FIG. 2 illustrates a flowchart of a method according to another embodiment of the present invention.

FIG. 2 is a flowchart of a method according to another embodiment of the present invention. In the embodiment, the RRS actively requests from the management system the BRAS key information associated with the IP address information of the user terminal. In this embodiment, IP address information is give as an example of the address information of the user terminal. However, the address information of the user terminal according to embodiments of the invention is not limited to IP address information.

Referring to FIG. 2, the method includes the following steps.

Step 201: The RRS receives a request initiated by the user terminal via the BRAS.

The user terminal may be of various types. For instance, the user terminal may be a computer, a set top box, a mobile station or a video telephony, etc. The user terminal initiates a request to the BRAS. The request carries the IP address information of the user terminal. The BRAS subsequently forwards the request to the request routing server. Then, the request routing server receives the request.

Step 202: The RRS obtains the IP address information of the user terminal from the request and requests from the management system the BRAS key information associated with the IP address information.

The bonding relationship between the IP address information of the user terminal and the BRAS key information is pre-configured in the management system.

The IP address information of the user terminal may be changed dynamically. Therefore, when pre-configuring the bonding relationship between the IP address information of the user terminal and the BRAS key information, a certain range of the IP address may be allowed for bonding with the BRAS key information.

In addition, when the user terminal accesses the network via the BRAS, the BRAS may actively inform the policy server at the network side of the IP address information of the user terminal or send the IP address information of the user terminal to the policy server according to the requirement. Therefore, the management system may obtain IP address information of each user terminal from each policy server and maintain the bonding relationship between the IP address information of the user terminal and the BRAS key information. The maintenance may include modification, addition and deletion, etc.

Because the BRAS is relevant to the geographical area, the BRAS key information may be used for uniquely reflecting the attribute of the geographical area. The BRAS key information herein may refer to BRAS IP address information, or may be BRAS ID information. With the BRAS IP address information, the conventional IP/Mast method may be allowed for continuous usage, for instance, 218.19.1.0/24. The BRAS IP address information of each BRAS device is assigned uniquely for uniquely identifying the BRAS device. The BRAS ID is also a unique ID assigned by the operator for each BRAS device. The BRAS ID may uniquely identify the BRAS device. It should be noted that the information which can be used to uniquely identify the BRAS device may serve as the BRAS key information.

When the RRS receives the request initiated by the user terminal, the RRS may obtain the IP address information of the user terminal from the request and request from the management system the BRAS key information associated with the IP address information.

It should be noted that to avoid significant impact on the system performance and meanwhile to ensure that the dispatching is performed in real-time, the following optimism mechanism can be adopted when this step is being performed.

If the ID address information of a particular user terminal indicates that it is the first time for the user terminal to access a CDN service, the RRS may request from the management system the BRAS key information associated with the IP address information by virtue of an XML over HTTP manner (i.e. using Hyper Text Transfer Protocol, HTTP, and eXtensible Markup Language, XML). Furthermore, a valid period for the IP address information of the user terminal is set. Within the valid period, the RRS locally stores and maintains the bonding relationship between the IP address information and the BRAS key information. That is, an information caching mechanism is provided. When a service request is initiated again from the IP address, the RRS directly retrieves the BRAS key information associated with the IP address information from the records stored locally. The RRS may not update the BRAS key information with the management system until the valid period expires. In this way, the interaction with the management system is decreased and the system performance can be immune from significant impact.

Step 203: The RRS redirects the request to the nearby CDN node according to the pre-configured dispatching policy based on BRAS key information.

The RRS is pre-configured with the dispatching policy based on the BRAS key information, i.e. the bonding relationship between the BRAS key information and the CDN node.

In the case where the BRAS key information is BRAS IP address information, the BRAS IP address information or the BRAS IP address information of a certain network segment is bonded with a nearby CDN node. For example, if it is assumed that 218.19.1.100 is the IP address of a BRAS device in Guangzhou Province, then 218.19.1.100/32 may be configured as to be related to the CDN Guangzhou node. If all of the BRAS devices in the network segment 218.19.1.0 belong to Guangzhou, then the IP address of this network segment, i.e. 218.19.1.0/24, may all be configured as to be related to the CDN Guangzhou node.

In the case where the BRAS key information is BRAS ID, since the BRAS ID is the unique ID assigned by the operator for each BRAS device, the BRAS ID can be bonded with the closet CDN node.

After the RRS obtains the BRAS key information associated with the IP address information of the user terminal, the RRS may redirect the request from the user terminal to the nearby CDN node, based on the pre-configured bonding relationship between the BRAS key information an the CDN node. The CDN node serves as a serving node.

Step 204: The user terminal may acquire service from a nearby redirected CDN node.

After the RRS redirects the request from the user terminal to the nearby CDN node, based on the pre-configured bonding relationship between the BRAS key information and the CDN node, the user terminal may be able to acquire service from the nearby redirected CDN node. As a result, the access speed may be enhanced, and the possibility of the occurrence of the network congestion can be decreased.

As can be seen from the embodiment, once the RRS actively obtains from the management system the BRAS key information associated with the IP address information of the user terminal, the RRS may begin to search for the bonding relationship between the BRAS key information and the CDN node. The BRAS key information may then be used to determine the home area of the user. As a result, the object of identifying geographical area can be achieved. A nearby CDN node is thus chosen for providing service to the user terminal. Consequently, the access speed is improved, and the possibility of the occurrence of network congestion is decreased.

Figure 3:
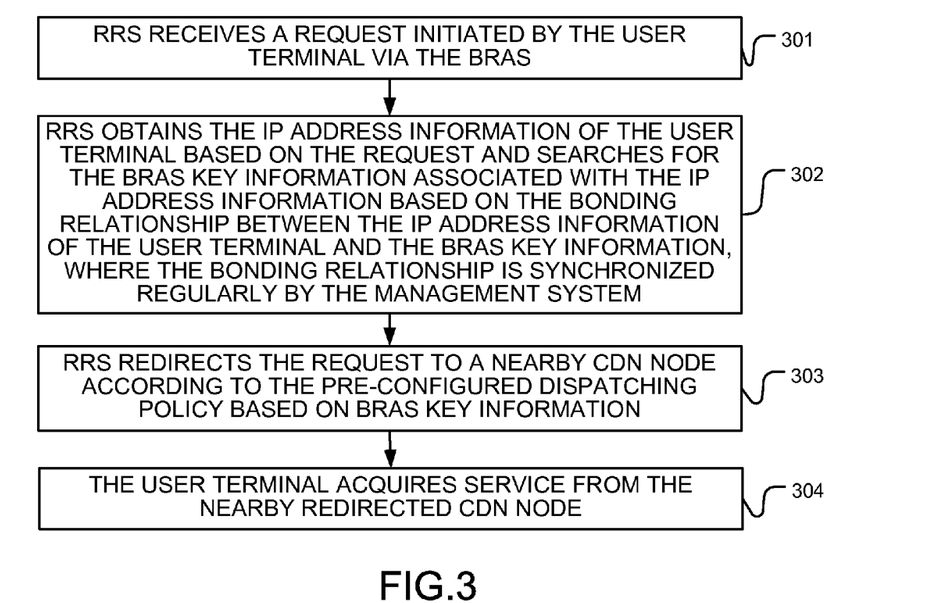
FIG. 3 illustrates a flowchart of a method according to yet another embodiment of the present invention.

FIG. 3 illustrates another flowchart of a method according to yet another embodiment of the present invention. In this embodiment, the IP address information is given as an example of the address information of the user terminal. It should be noted that the address information of the user terminal according to embodiments of the present invention is not limited to IP address information. The difference between the present embodiment and the embodiment in FIG. 2 lies in that, the management system according to the present embodiment regularly synchronizes with the RRS the bonding relationship between the IP address information of the user terminal and the BRAS key information. In this way, the RRS may search information from local records.

Referring to FIG. 3, the method includes the following steps.

Step 301: The RRS receives a request initiated by the user terminal via the BRAS.

The user terminal may include, but not limited to, a computer, a set top box, a mobile station or a video telephony, etc. The user terminal initiates a request to the BRAS. The request carries the IP address information of the user terminal. The BRAS re-forwards the request to the request routing server. Then, the request routing server receives the request.

Step 302: The RRS obtains the IP address information of the user terminal based on the request and searches for the BRAS key information associated with the IP address information based on the bonding relationship between the IP address information of the user terminal and the BRAS key information, where the bonding relationship is synchronized regularly by the management system.

The bonding relationship between the IP address information of the user terminal and the BRAS key information is pre-configured in the management system.

The IP address information of the user terminal may be changed dynamically. Therefore, when pre-configuring the bonding relationship between the IP address information of the user terminal and the BRAS key information, a certain range of the IP address may be allowed for bonding with the BRAS key information.

In addition, when the user terminal accesses the network via the BRAS, the BRAS may actively inform the policy server at the network side of the IP address information of the user terminal or send the IP address information of the user terminal to the policy server according to the requirement. Therefore, the management system may obtain IP address information of each user terminal from each policy server and maintain the bonding relationship between the IP address information of the user terminal and the BRAS key information. The maintenance may include modification, addition and deletion, etc.

Because the BRAS is relevant to the geographical area, the BRAS key information may be used for uniquely reflecting the attribute of the geographical area. The BRAS key information herein may be BRAS IP address information, and may also be BRAS ID information. With the BRAS IP address information, the conventional IP/Mast method may be allowed for continuous usage, for instance, 218.19.1.0/24. The BRAS IP address information of each BRAS device is assigned uniquely for uniquely identifying the BRAS device. The BRAS ID is also a unique ID assigned by the operator for each BRAS device. The BRAS ID may uniquely identify the BRAS device. It should be noted that the information which can be used to uniquely identify the BRAS device may serve as the BRAS key information.

Different from the step illustrated in FIG. 2 that the RRS needs to actively request BRAS key information from the management system, in this step, the management system regularly synchronizes with the RRS the bonding relationship between the IP address information of the user terminal and the BRAS key information. The interface may be in the form of XML over HTTP. Therefore, when the RRS receives the request initiated by the user terminal, the RRS may obtain the IP address information of the user terminal and may then retrieve the BRAS key information associated with the IP address information directly from the records stored locally. In this way, the interaction with the management system is decreased, and the system performance can be immune from significant impact.

If the RRS cannot find, from the records stored locally, the BRAS key information associated with the IP address information, the RRS may again actively query the management system to obtain related information, or may select a central node configured by default policy as the redirected node.

Step 303: The RRS redirects the request to the nearby CDN node according to the pre-configured dispatching policy based on BRAS key information.

The RRS is pre-configured with the dispatching policy based on the BRAS key information, i.e. the bonding relationship between the BRAS key information and the CDN node.

In the case where the BRAS key information is BRAS IP address information, the BRAS IP address information or the BRAS IP address information of a certain network segment is bonded with the nearby CDN node. For example, if it is assumed that 218.19.1.100 is the IP address of a BRAS device in Guangzhou, then, 218.19.1.100/32 may be configured as to be related to the CDN Guangzhou node. If all of the BRAS devices in the network segment 218.19.1.0 belong to Guangzhou, then the IP address of this network segment, i.e. 218.19.1.0/24, may all be configured as to be related to the CDN Guangzhou node.

In the case where the BRAS key information is BRAS ID, since the BRAS ID is the unique ID assigned by the operator for each BRAS device, the BRAS ID can be bonded with the closet CDN node.

After the RRS obtains the BRAS key information associated with the IP address information of the user terminal, the RRS may redirect the request from the user terminal to the nearby CDN node, based on the pre-configured bonding relationship between the BRAS key information an the CDN node.

Step 304: The user terminal may acquire service from the nearby redirected CDN node.

After the RRS redirects the request from the user terminal to the nearby CDN node, based on the pre-configured bonding relationship between the BRAS key information and the CDN node, the user terminal may be able to acquire service from the nearby redirected CDN node. As a result, the access speed may be enhanced, and the possibility of the occurrence of the network congestion can be decreased.

As can be seen from the embodiment, once the RRS obtains from the local records the BRAS key information associated with the IP address information of the user terminal and synchronized by the management system, the RRS may begin to search for the bonding relationship between the BRAS key information and the CDN node. The BRAS key information may then be used to determine the home area of the user. As a result, the object of identifying geographical area can be achieved. A nearby CDN node is thus chosen for providing service to the user terminal. Consequently, the access speed is improved, and the possibility of the occurrence of network congestion is decreased.

The above description introduces a dispatching method according to an embodiment of the present invention. A dispatching apparatus and a dispatching system thereof are also provided according to embodiments of the present invention.

Figure 4:
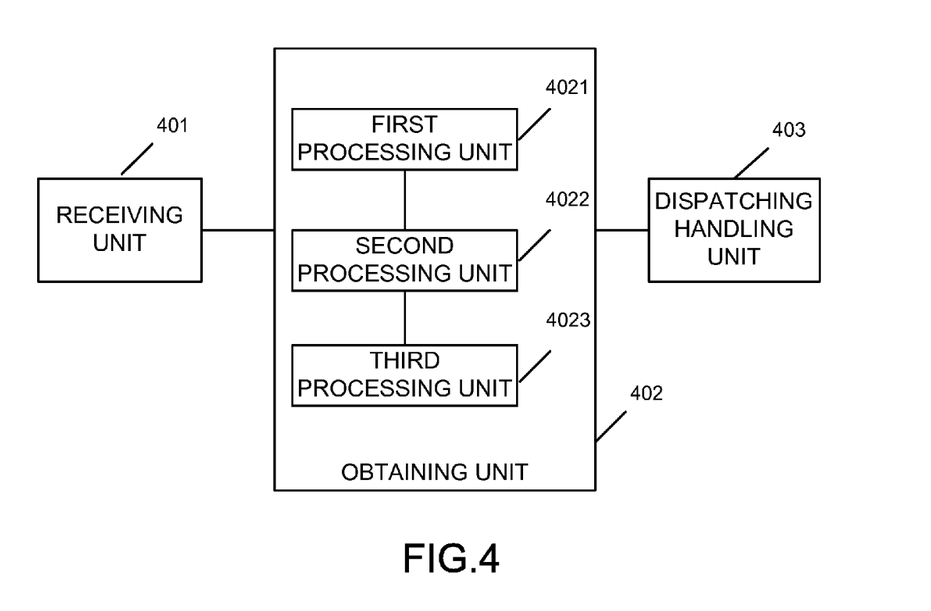
FIG. 4 is a schematic diagram of a dispatching apparatus according to an embodiment of the present invention.

Referring to FIG. 4, a block diagram of a dispatching apparatus according to an embodiment of the present invention is illustrated.

As illustrated in FIG. 4, the dispatching apparatus may include a receiving unit 401, an obtaining unit 402, and a dispatching handling unit 403. The dispatching apparatus may be a request routing server (RRS).

The receiving unit 401 is configured to receive a request initiated by a user terminal. The request carries address information of the user terminal. The address information of the user terminal herein may be the IP address information, and may also be other type of address information.

The obtaining unit 402 is configured to obtain key information of the access server associated with the address information after obtaining the address information in the request from the receiving unit 401. The BRAS key information herein may be BRAS address information, or may be BRAS ID information. In addition, the information which can be used to uniquely identify the BRAS device may serve as the BRAS key information.

The dispatching handling unit 403 is configured to search for a corresponding node based on the key information of the access server obtained by the obtaining unit 402. The node may serve as a redirected serving node.

The obtaining unit 402 may include a first processing unit 4021, a second processing unit 4022, and a third processing unit 4023.

Embodiment 1

The first processing unit 4021 is configured to obtain from the management system the key information of the access server associated with the address information after obtaining the address information from the receiving unit 401.

The second processing unit 4022 is configured to receive from the management system the key information of the access server associated with the address information.

The third processing unit 4023 is configured to store the key information of the access server after the second processing unit 4022 receives from the management system the key information associated with the address information. The third processing unit 4023 is further configured to set a valid period for the address information. The key information of the access server associated with the address information can be obtained from the stored records if a request initiated from the address of the same user terminal is received again within the valid period.

Embodiment 2

The first processing unit 4021 is configured to record the bonding relationship between the address information of the user terminal and the key information of the access server, where the bonding relationship is synchronized by the management system.

The second processing unit 4022 is configured to obtain, after the address information is obtained from the receiving unit 402, the key information of the access server associated with the address information in the request, based on the bonding relationship between the address information of the user terminal and the key information of the access server. The bonding relationship is synchronized by the management system.

The third processing unit 4023 is configured to request, if the second processing unit 4022 fails to obtain the key information of the access server associated with the address information in the request, the key information of the access server associated with the address information from the management system and configured to receive from the management system the key information of the access server associated with the address information.

Figure 5:
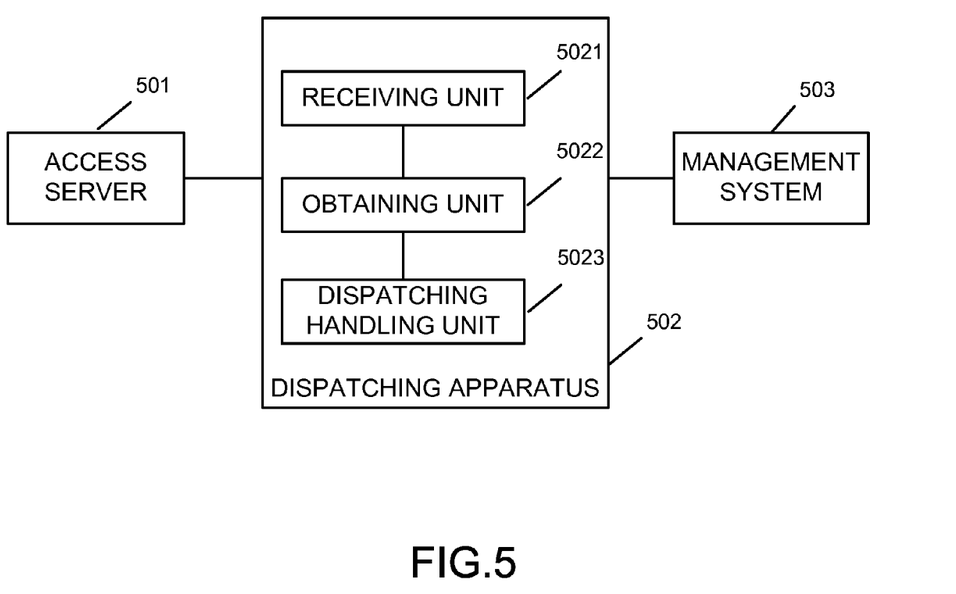
FIG. 5 is a schematic diagram of a dispatching system according to an embodiment of the present invention.

Referring to FIG. 5, a schematic diagram of a dispatching network according to an embodiment of the present invention is illustrated.

As illustrated in FIG. 5, the dispatching system may include an access server 501 and a dispatching apparatus 502.

The access server 501 is configured to receive the request initiated by the user terminal and then forward the request. The request carries address information of the user terminal.

The dispatching apparatus 502 is configured to receive the request forwarded by the access server 501. After obtaining the address information in the request, the dispatching apparatus 502 obtains the key information of the access server associated with the address information and searches for a corresponding node based on the key information of the access server. The node serves as a redirected serving node.

The dispatching system further includes a management system 503 for configuring bonding relationship between the address information of the user terminal and the key information of the access server and sends the bonding relationship between the address information and the key information of the access server to the dispatching apparatus 502.

The dispatching apparatus 502 may include a receiving unit 5021, an obtaining unit 5022, and a dispatching handling unit 5023.

Embodiment 1

The receiving unit 5021 is configured to receive the request forwarded by the access server 501.

The obtaining unit 5022 is configured to obtain, after obtaining the address information in the request, the key information of the access server associated with the address information from the management system 503 and receive from the management system 503 the key information of the access server associated with the address information.

The dispatching handling unit 5023 is configured to search for a node associated with the key information of the access server obtained by the obtaining unit 5022. The node may serve as a redirected node.

Embodiment 2

The receiving unit 5021 is configured to receive the request forwarded by the access server 501.

The obtaining unit 5022 is configured to obtain, after the address information is obtained, the key information of the access server associated with the address information in the request, based on the recorded bonding relationship between the address information of the user terminal and the key information of the access server. The bonding relationship is synchronized by the management system.

The dispatching handling unit 5023 is configured to search for a node associated with the key information of the access server obtained by the obtaining unit 5022. The node may serve as a redirected node.

The obtaining unit 5022 may further include a first processing unit, a second processing unit, and a third processing unit. The description of these units may refer to the description of FIG. 4.

In conclusion, according to the embodiments of the present invention, by obtaining the BRAS key information associated with the address information of the user terminal, the bonding relationship between the BRAS key information and the node can be found. The BRAS key information may then be used to determine the home area of the user. As a result, the object of identifying geographical area can be achieved. A corresponding node is thus chosen for providing service to the user terminal. Consequently, the access speed is improved, the possibility of the occurrence of network congestion is decreased, and the adaptability is increased.

Furthermore, according to the embodiments of the present invention, the BRAS key information associated with the address information of the user terminal may be obtained by actively making a request from the management system. Alternatively, the management system may regularly synchronize with the dispatching apparatus the bonding relationship between the address information of the user terminal and the key information of the access server. Therefore, the present invention allows for a more flexible application.

The foregoing description is detailed introduction to a dispatching method, a dispatching apparatus and a dispatching system according to embodiments of the present invention. Several specific examples are given to illustrate the principle and implementation of the present invention. The description of the embodiments is intended merely to facilitate the understanding of the method and key ideas of the present invention. Further, it is readily appreciated by those skilled in the art that any modification can be made to the specific implementation and application within the spirit of the present invention. Accordingly, the content of the specification shall not be construed as a limitation to the present invention.

What is claimed is:

1. A dispatching method, comprising:
receiving a request initiated by a user terminal, wherein the request carries address information of the user terminal;
obtaining the address information carried in the request and obtaining key information of an access server associated with the address information;
searching for a corresponding node based on the key information of the access server and treating the node as a redirected serving node;
wherein the obtaining the key information of the access server associated with the address information comprises: requesting from a management system the key information of the access server associated with the address information, and receiving from the management system the key information of the access server associated with the address information;
after receiving from the management system the key information of the access server associated with the address information, the method further comprises: storing the key information, configuring a valid period for the address information, and obtaining the key information of the access server associated with the address information from stored records if a request initiated from an address of the same user terminal is received again within the valid period; and
wherein the receiving the request initiated by the user terminal comprises: receiving, by a request routing server, the request initiated by the user terminal.

2. The method of claim 1, wherein the obtaining the key information of the access server associated with the address information comprises:
obtaining, based on recorded bonding relationship between the address information of the user terminal and the key information of the access server, the key information of the access server associated with the address information carried in the request, wherein the bonding relationship is synchronized by the management system.

3. The method of claim 2, comprising:
requesting the key information of the access server associated with the address information from the management system, and receiving from the management system the key information of the access server associated with the address information, if the obtaining of the key information of the access server associated with the address information carried in the request fails.

4. The method of claim 1, wherein the key information of the access server comprises address information of the access server or ID information of the access server.

5. The method of claim 1, wherein:
the access server is a Broadband Remote Access Server.

6. A dispatching apparatus, comprising:
a central processing unit (CPU) coupled to a memory;
a receiving unit, configured to receive a request initiated by a user terminal, wherein the request carries address information of the user terminal;
an obtaining unit, configured to obtain the address information carried in the request and obtaining key information of an access server associated with the address information;
a dispatching handling unit, configured to search for a corresponding node based on the key information of the access server obtained by the obtaining unit, wherein the node serves as a redirected serving node;
wherein the obtaining unit comprises:
a first processing unit, configured to obtain from a management system the key information of the access server associated with the address information after obtaining the address information from the receiving unit;
a second processing unit, configured to receive from the management system the key information of the access server associated with the address information; and
a third processing unit, configured to store the key information of the access server associated with the address information after the second processing unit receives the key information from the management system, set a valid period for the address information, and obtain the key information of the access server associated with the address information from stored records if a request initiated from an address of the same user terminal is received again within the valid period; and
wherein the dispatching apparatus is a request routing server.

7. The dispatching apparatus of claim 6, wherein the obtaining unit comprises:
a first processing unit, configured to record bonding relationship between the address information of the user terminal and the key information of the access server, wherein the bonding relationship is synchronized by the management system; and
a second processing unit, configured to obtain, after the address information is obtained from the receiving unit, the key information of the access server associated with the address information carried in the request, based on the bonding relationship between the address information of the user terminal and the key information of the access server, wherein the bonding relationship is synchronized by the management system.

8. The dispatching apparatus of claim 7, wherein the obtaining unit further comprises:
a third processing unit, configured to request, if the second processing unit fails to obtain the key information of the access server associated with the address information carried in the request, the key information of the access server associated with the address information from the management system, and receive from the management system the key information of the access server associated with the address information.

9. A dispatching system, comprising:
an access server, configured to receive a request initiated by a user terminal and forward the request, wherein the request carries address information of the user terminal; and
a dispatching apparatus, configured to receive the request forwarded by the access server, obtain the address information carried in the request and obtain key information of the access server associated with the address information, and search for a corresponding node based on the key information of the access server, wherein the node serves as a redirected serving node;

a management system, configured to configure bonding relationship between the address information of the user terminal and the key information of the access server, and send the bonding relationship between the address information and the key information of the access server to the dispatching apparatus;

wherein the dispatching apparatus comprises:

a central processing unit (CPU) coupled to a memory;

a receiving unit, configured to receive the request forwarded by the access server;

an obtaining unit, configured to obtain, after obtaining the address information carried in the request, the key information of the access server associated with the address information from the management system, and receive from the management system the key information of the access server associated with the address information; and a dispatching handling unit, configured to search for a corresponding node based on the key information of the access server obtained by the obtaining unit, wherein the node serves as a redirected serving node; and wherein the dispatching apparatus is a request routing server.

10. The dispatching system of claim 9, wherein the dispatching apparatus comprises:

a receiving unit, configured to receive the request forwarded by the access server;

an obtaining unit, configured to obtain, after obtaining the address information carried in the request, the key information of the access server associated with the address information from the management system, and receive from the management system the key information of the access server associated with the address information; and a dispatching handling unit, configured to search for a corresponding node based on the key information of the access server obtained by the obtaining unit, wherein the node serves as a redirected serving node.

11. The dispatching system of claim 9, wherein the dispatching apparatus comprises:

a receiving unit, configured to receive the request forwarded by the access server;

an obtaining unit, configured to obtain, after the address information carried in the request is obtained, the key information of the access server associated with the address information in the request, based on recorded bonding relationship between the address information of the user terminal and the key information of the access server, wherein the bonding relationship is synchronized by the management system; and a dispatching handling unit, configured to search for a corresponding node based on the key information of the access server obtained by the obtaining unit, wherein the node serves as a redirected serving node.

12. The dispatching system of claim 9, wherein the dispatching apparatus comprises:

a receiving unit, configured to receive the request forwarded by the access server;

an obtaining unit, configured to obtain, after the address information carried in the request is obtained, the key information of the access server associated with the address information in the request, based on recorded bonding relationship between the address information of the user terminal and the key information of the access server, wherein the bonding relationship is synchronized by the management system; and a dispatching handling unit, configured to search for a corresponding node based on the key information of the access server obtained by the obtaining unit, wherein the node serves as a redirected serving node.

* * * * *